UNITED STATES PATENT OFFICE.

FRITZ KLATTE AND ADOLF ROLLETT, OF SCHWANHEIM-ON-THE-MAIN, GERMANY, ASSIGNORS TO THE FIRM OF CHEMISCHE FABRIK GREISHEIM-ELEKTRON, OF FRANKFORT-ON-THE-MAIN, GERMANY, A CORPORATION OF GERMANY.

PLASTIC COMPOSITION AND PROCESS OF PRODUCING IT.

1,241,738.      Specification of Letters Patent.      Patented Oct. 2, 1917.

No Drawing.      Application filed July 2, 1914. Serial No. 848,689.

*To all whom it may concern:*

Be it known that we, FRITZ KLATTE and ADOLF ROLLETT, the first a subject of the German Emperor and the second a subject of the Austrian Emperor, and both residents of Schwanheim-on-the-Main, Germany, have invented certain new and use Improvements in Plastic Compositions and Processes of Producing Them, of which the following is a specification.

According to this invention new materials which are useful in the arts are obtained from vinyl esters, such as vinyl halids or vinyl esters of organic acids, or mixtures thereof, the said new materials having properties varying according to the initial matter, or matters employed and the conditions under which the operations are carried out. This invention consists in polymerizing, by exposing to light, or heat, or otherwise, a vinyl-ester (for example, the vinyl ester of an acetic acid compound such as the vinyl ester of acetic acid or of mono-chlor-acetic acid) whereby solid masses which may be as clear as glass and colorless are obtained, these masses having properties which render them useful in the arts, for instance, they constitute excellent substitutes for celluloid, or like substances.

The polymerization may be effected in any suitable manner, for instance, by lighting, or heating, or by heating together with exposure to light.

We have found that the polymerization can be greatly accelerated by the use of substances which act catalytically. As catalysts we may use for instance, an organic peroxid, an ozonid, an organic acid anhydrid in conjunction with oxygen, or an agent giving off oxygen, a perborate, a percarbonate, or a metal oxid for instance a silver oxid.

The catalyst will act not only as an accelerator of the reaction, but will have more, or less, effect on the properties of the products obtained. We can therefore modify the properties of the products by the employment of different catalysts.

The following examples illustrate how this invention can be performed but it is not limited to these examples.

Example I.

Vinyl acetate (or vinyl mono-chlor-acetate) is exposed in a suitable vessel to the action of direct sunlight, or to rays of an artificial light, for instance those of a mercury vapor lamp. The polymerization products, which form more or less rapidly in accordance with the intensity of illumination and the temperature, are solid, colorless and transparent celluloid like masses which are odorless and can be turned, cut, planed, and otherwise manipulated to form various articles. The solid masses obtained can be rendered plastic in hot water and then be molded and, after cooling, the mass becomes again hard, or solid. In order to obtain special effects the initial materials may be mixed, prior to exposure to light, with other bodies or conditioning agents, such, for instance, as camphor, coloring matters or the like.

Example II.

1 kilogram of vinyl chlor-acetate is mixed with from 0.5 to 1 gram peroxid of benzoyl and carefully heated in a large vessel provided with a reflux condenser. At from 80° to 100° centigrade the polymerization takes place, while the temperature rises rapidly. At this time care should be taken to cool the reaction vessel. The energy of the reaction may be modified by diluting the reaction liquid with an indifferent solvent; for instance, in the present example, about 300 grams of chloro-benzene can be used.

The reaction product is a viscous syrupy mass, which can be further treated in various ways, for instance by exposing to light the mass without a diluent, the aforesaid valuable solid masses being obtained as the remaining unaltered vinyl ester polymerizes. The solid masses can also be obtained by distillation *in vacuo* from them and any diluent that may have been added.

The masses resulting from polymerization can immediately (*i. e.* in the state they have been obtained) be made into useful articles. It is possible to obtain the required articles if, for instance, the polymerization be carried out while the initial material is in a suitable mold, for instance one of glass, so that the articles, for example umbrella handles, are obtained directly from the mold. Or if desired the masses may be worked to the required shape by softening the mass and, after shaping it, evaporating the solvent.

If the polymerization products be obtained, for instance, by heating, they can be worked into the required shapes in various ways, for example, they can be softened and kneaded, rolled, compressed, drawn, into wires or the like, or the masses can be mixed with additional substance, and rolled into plates, or films, or they may be pressed into the required shapes such as buttons, combs, and the like.

The said solid masses can be worked by cutting, sawing, filing, or the like, whether they be obtained directly by polymerization, or after special treatment of the polymerization masses.

The objects made of solid polymerization products can, like celluloid, be polished, and parts be connected together by smearing with a suitable solvent, such as acetone, epi-chlor-hydrin, or the corresponding vinyl ester.

By dissolving the polymerization product in a suitable solvent and evaporating the solvent, it is possible to manufacture useful articles of the most varied nature for instance films. Moreover it is possible from the highly viscous solutions obtained by the incomplete polymerization of the initial matters to separate out, by means of precipitating agents such as alcohol, or ether, the polymerized product as a plastic mass and to make the required articles from this. Likewise the spinning, or squirting, of the viscous solution into a precipitating liquor enables the polymerization product to be obtained in the form of threads.

By the addition of suitable matters such as organic acids, alcohols, esters (for instance cellulose acetate), or oils, bodies in powder, such as ZnO, and the like, the properties of the mass obtained can be modified in many ways. Thus it is possible to produce instead of hard glass-like masses, also soft and flexible masses. Likewise, by the addition of suitable coloring means, it is possible to produce masses, or objects, having any desired color effects. The incorporation of the additions can be effected either before, or during, the polymerizing process, or the additions can be made to the already formed polymerization products in a suitable condition.

As the solid products are bad conductors of electricity, they can be used as insulating material. A special advantage is that the articles made from the polymerization products can at the time of making, have imparted to them the most varied valuable properties as required. Further advantages are the extraordinary fire proof character of the masses and articles produced therefrom and their perfect odorlessness which properties are important in view of the readily inflammable character of articles made of cellulose.

*Example III.*

Vinyl acetate, (or vinyl chlor-acetate) is exposed to natural, or artificial, light until a syrupy, and mobile liquid is produced. This liquid is then poured, or spread in thin layers and the still unchanged ester is partly evaporated, and by further exposure to light, allowed to polymerize. In this way colorless films of a celluloid-like nature are obtained.

It is also possible to dissolve the solid polymerization products, obtained in accordance with Example I, in acetylene tetrachlorid, or ethylidene di-acetate, until they form a thick syrup-like liquid, and to pour, or spread, them out in a thin layer. After evaporating the solvent, celluloid-like films are obtained. By additions of various kinds to the syrupy liquids the properties and appearance of the products can be modified as required.

We have further found that the products resulting from the polymerization of organic vinyl esters can be used for coating, painting, or impregnating purposes, either before, or immediately after, the addition of suitable solvents.

If the polymerization of an organic vinyl ester, for instance vinyl-mono-chlor-acetate, be carried out in an incomplete manner, a syrupy solution of the polymerization product in still unchanged vinyl ester, is obtained. The product thus obtained can be utilized either directly, or along with other solvents, or diluents, for the production of substances to be used for coating, painting, or impregnating, purposes. If, for instance, a porous substance such as wood, paper, textile fabric, artificial stone, or the like, be coated with the said syrupy solution or be impregnated therewith, very resistant coatings and impregnations are obtained on completing the polymerization of the coating, painting, or impregnation, for instance by exposing the article to artificial, or natural, light, or by heating it, or by employing both light and heat. In this case a portion of the unchanged vinyl ester in the syrupy solution is evaporated while another portion is converted into the solid polymerization product. The articles thus treated have imparted to them very high resistance to external influences they being for example capable of resisting the action of water, acids, alkalis and atmospheric changes.

Or the said syrupy mass can be mixed with comminuted matter, such, for instance, as ground cork, or ground wood, fibrous substances or the like and the mixture be made into the proper shape and the unchanged vinyl esters in the articles be converted, by suitable polymerization, into the insoluble solid final product.

It is also possible to start from solid, semi-solid, or plastic, polymerization products of the vinyl esters, these being softened by heating them by themselves, or with suitable solvents, and using them in their softened state. On cooling, or on the evaporation of the diluent that may still be present the product is converted into the solid, lacquer-like form.

Likewise the polymerization products of the vinyl esters can be dissolved in a suitable solvent and be used as a lacquer. If for instance 6 grams of polymerized vinyl acetate be dissolved in 100 cubic centimeters of ethyl acetate, a dipping lacquer of excellent qualities is obtained.

By dissolving 5 grams of the polymerized vinyl chlor-acetate in 60 grams of acetylene tetrachlorid a solution is obtained which can be directly used for lacquering. Instead of using acetylene tetrachlorid, or ethyl acetate, by itself, solvents, especially mixtures of solvents, can also be employed which have different boiling points. Thus ketones and esters of all kinds, also di-chlor-ethylene, trichlor-ethane, ethylene chlorid, acetylene tetrachlorid and the like can be used for this purpose. To mixtures of two, or more, of these solvents there may be also added, in the production of lacquer solutions, liquids which do not possess by themselves, any power of dissolving the polymerized products such as, for instance, hydrocarbons, chloro benzene and the like.

It is obvious that mixtures of various polymerized vinyl esters can be used for lacquering, painting, or impregnating in accordance with this invention. It is likewise obvious that the wholly, or partly, polymerized esters can be mixed with suitable additional substances to modify the properties of the lacquering, painting, or impregnating, materials in any desired manner. As additions of this kind we mention oils, (such, for instance, as castor oil), dyes, powdered substances, (such as zinc-oxid) camphor, and camphor substitutes and the like.

If, instead of organic vinyl esters, vinyl halids, for instance vinyl chlorid, or vinyl bromid, be polymerized, masses are obtained which are not industrially utilizable, they being opaque, porous, and chalk-like, and readily crumbling to a white powder.

In accordance with this invention it is however possible to obtain from these valueless masses valuable products if the said masses be dissolved, or softened, in the hereinbefore described manner and then be converted again to the solid state. By this treatment from the aforesaid masses products are obtained which are suitable for all purposes for which cellulose esters, or celluloid have hitherto been used, namely as substitutes for horn, amber, or artificial resins, or lacquers, or for impregnating purposes and also for the production of films, artificial threads, and the like.

These products have the advantage of being very fireproof and odorless. By the addition of suitable agents, the strength and hardness of the products may be modified within wide limits so that it is possible to manufacture, from the polymerization products, both hard, horn-like, substances and soft and more ductile substances. The nature of the polymerization, due to the wave length of the rays of the source of illumination employed, has an influence on the properties of the products.

The treatment of the initial material can be carried out in such a manner that it is dissolved and the solvent is again removed by evaporation, or precipitation, of the dissolving substances. In many cases however it is more profitable to use an amount of solvent insufficient to produce complete solution, so that soft plastic masses are obtained which can be pressed, kneaded, rolled or drawn into shape, or formed into blocks, plates, or films.

The following are examples of numerous possible modes of treatment and uses.

*Example IV.*

The polymerization product obtained as aforesaid in the sun, ultra violet rays, or the arc light, from vinyl chlorid, is dissolved in hot chloro benzene and the solution is poured out in thin layers. These layers, being of sufficient concentration, solidify to a jelly and after the evaporation of the solvent, the polymerized vinyl chlorid remains in the form of a transparent flexible film which will not readily burn.

By suitable additions, the properties of these products can be varied within wide limits. The chloro-benzene can be replaced by other solvents for instance we may use any of the higher chlorinated benzenes, or their homologues, or any of the halogen-substituted ethanes, or epi-chlor-hydrin or other solvents. Unsuitable, or less suitable, solvents are, for instance, chlorinated ethylene, chloroform, carbon tetra chlorid, carbon disulfid, alcohol, ether, water, and the like.

The solution in chlorobenzene, or in other solvent can also be used directly for lacquering, or impregnating.

The product can also be separated by precipitation from a non-solvent agent and be subjected to any further desired treatment. By squirting it into a precipitating bath, artificial threads can be directly obtained.

*Example V.*

Polymerized vinyl chlorid is stirred, with a quantity of chloro benzene, or other solvent, not sufficient to cause dissolution, and is kneaded for some time. Then the product, while heated and pressed, is rolled into plates, or formed into blocks from which after cooling any desired articles can be cut or otherwise formed, these articles being like celluloid after the solvent has been evaporated. As the polymerized vinylchlorid is in itself plastic under high pressure the solvent can be entirely dispensed with if desired. It is furthermore possible to render the mass either transparent, or translucent and it is possible to render it similar to ivory by the addition of zinc oxid or the like. In this example, as also in Example I the ductility of the product and facility of manipulation may be increased by a plasticizing agent such as camphor, or camphor substitute.

We claim:

1. The process of producing a plastic composition which comprises causing a plurality of molecules of the same vinyl ester of an organic acid to combine together.

2. The process of producing a plastic composition which comprises polymerizing the vinyl ester of an organic acid by subjecting it to radiant energy.

3. The process of producing a plastic composition which comprises polymerizing the vinyl ester of an organic acid by subjecting it to the action of light rays.

4. The process of producing a plastic composition which comprises polymerizing the vinyl ester of an organic acid by subjecting it in admixture with a diluent to radiant energy.

5. The process of producing a plastic composition which comprises subjecting to the action of light rays the vinyl ester of an organic acid admixed with a conditioning agent.

6. The process of producing a plastic composition which comprises causing a plurality of molecules of the vinyl ester of an acetic acid compound to combine together.

7. The process of producing a plastic composition which comprises polymerizing the vinyl ester of an acetic acid compound by subjecting it to the action of light rays.

8. The process of producing a plastic composition which comprises polymerizing the vinyl ester of an acetic acid compound by subjecting it in admixture with a diluent to radiant energy.

9. The process of producing a plastic composition which comprises subjecting to the action of light rays the vinyl ester of an acetic acid compound admixed with a conditioning agent.

10. The process of producing a plastic composition which comprises subjecting the vinyl ester of an organic acid admixed with a solvent, to the action of light until some polymerization has been effected, and then removing the solvent.

11. The process of making a non-porous plastic composition which comprises producing an intimate mixture of a polymerized vinyl ester and a solvent therefor, shaping the plastic mass so produced, and removing the solvent.

12. The process of making a non-porous plastic composition which comprises producing an intimate mixture of a polymerized vinyl ester, a solvent therefor, and a conditioning agent, shaping the plastic mass so produced, and allowing the solvent to evaporate.

13. As a new material a product comprising a polymerized vinyl ester of an organic acid.

14. As a new material a product comprising a polymerized vinyl ester and being non-porous and amorphous.

15. As a new material a product comprising a polymerized vinyl ester and a diluent therefor, substantially as described.

16. As a new material a product comprising a polymerized vinyl ester and a conditioning agent, substantially as described.

17. As a new material a product comprising a polymerized vinyl ester, a solvent therefor and a conditioning agent, substantially as described.

18. As a new material a product comprising a polymerized vinyl ester, a solvent therefor, a plasticizing agent and a coloring material, substantially as described.

19. As a new material a product comprising a polymerized vinyl ester of an organic acid and a diluent therefor, substantially as described.

20. As a new material a product comprising a polymerized vinyl ester of an organic acid and a conditioning agent, substantially as described.

21. As a new material a product comprising a polymerized vinyl ester of an organic acid, a solvent therefor and a conditioning agent, substantially as described.

22. As a new material a product comprising a polymerized vinyl ester of an organic acid, a solvent therefor, a plasticizing agent and a coloring material, substantially as described.

23. As a new material a product comprising a polymerized vinyl ester of an acetic acid compound and a diluent therefor, substantially as described.

24. As a new material a product comprising a polymerized vinyl ester of an acetic acid compound and a conditioning agent, substantially as described.

25. As a new material a product comprising a polymerized vinyl ester of an acetic acid compound, a solvent therefor and a conditioning agent, substantially as described.

26. As a new material a product comprising a polymerized vinyl ester of an acetic acid compound, a solvent therefor, a plasticizing agent and a coloring material, substantially as described.

27. As a new lacquer a mixture comprising a polymerized vinyl ester of a acetic acid compound and a solvent therefor.

28. As a new lacquer a mixture comprising a polymerized vinyl ester of an acetic acid compound, a solvent therefor and a non-solvent liquid.

In testimony whereof we have signed our names to this specification in the presence of two subscribing witnesses.

FRITZ KLATTE.
ADOLF ROLLETT.

Witnesses:
JEAN GRUND,
CARL GRUND.